March 15, 1966 A. ALFORD 3,241,071

ELECTRICAL SIGNAL COMBINING

Filed Dec. 7, 1962

INVENTOR.
ANDREW ALFORD
BY
Ezekiel Wolf, Wolf and Greenfield
ATTORNEYS

United States Patent Office 3,241,071
Patented Mar. 15, 1966

3,241,071
ELECTRICAL SIGNAL COMBINING

Andrew Alford, 299 Atlantic Ave., Boston, Mass.

Filed Dec. 7, 1962, Ser. No. 243,128
10 Claims. (Cl. 325—439)

The present invention relates in general to electrical signal combining and more particularly concerns a novel system for mixing two high frequency signals from separate sources while maintaining a high degree of isolation between the two sources. The system is especially advantageous for use in a balanced detecting system where a relatively high level local oscillator signal is combined with a relatively low level input signal to produce an output signal of difference frequency while keeping nearly all the local oscillator signal and noise from the output.

It is an important object of the invention to provide means for combining two signals from different sources while providing a high degree of isolation between the two sources.

It is still another object of the invention to achieve the preceding object and translate the frequency spectrum of one of the signals while keeping the other of the signals from being transmitted to the output.

It is a further object of the invention to achieve the preceding objects with relatively simple apparatus capable of achieving the preceding objects over a wide range of frequencies with little adjustment, an adjustment which may be set once and achieve the preceding objects for long periods of time.

Apparatus according to the invention includes hybrid means having a parallel branch, a series branch and first and second side branches. The hybrid means includes both means for delivering a signal applied to the series branch to the side branches in substantial phase opposition and means for delivering a signal applied to the parallel branch to the side branches in substantial phase coincidence. Means including first and second nonlinear impedance means terminate the first and second side branches, respectively. The first and second nonlinear impedance means are responsive to a signal applied to one of the series and parallel branches and comprise means for terminating the side branches, upon receiving such a signal, in substantially equal time varying impedances to continuously maintain a high degree of isolation between the series and parallel branches. Typically that signal is a local oscillator signal and the nonlinear impedance means comprises unilaterally conducting devices. First and second ones of the unilaterally conducting devices are coupled to the first and second side branches respectively. Means may couple a local oscillator signal source to one of the series and parallel branches to simultaneously and substantially equally alter the conductivity of the unilaterally conducting devices. When the latter source is coupled to the parallel branch, it is preferred that the two devices be poled in like sense. When the local oscillator signal is coupled to the series branch, it is preferred that the devices be poled in opposite sense. These devices may be diodes which are conductive and nonconductive simultaneously to substantially continuously terminate the side branches in substantially equal impedances and thereby maintain a high degree of isolation between the series and parallel branches at all times.

According to another aspect of the invention, each side branch is terminated in nonlinear impedance means comprising a pair of oppositely poled unilaterally conducting devices. Under these circumstances isolation is maintained regardless of which of the series and parallel branches receives the relatively strong oscillator signal.

When the invention is employed for balanced detecting, means including the nonlinear impedance means are provided for combining the outputs of the side branches so as to reject the local oscillator signal and noise from the output while transmitting the relatively low level input signal applied to the other of the series and parallel branches to the output with spectral components translated to a point determined by the local oscillator signal frequency.

Numerous other features, objects and advantages of the invention will become apparent from the following specification when read in connection with the accompanying drawing in which.

Figure 1:
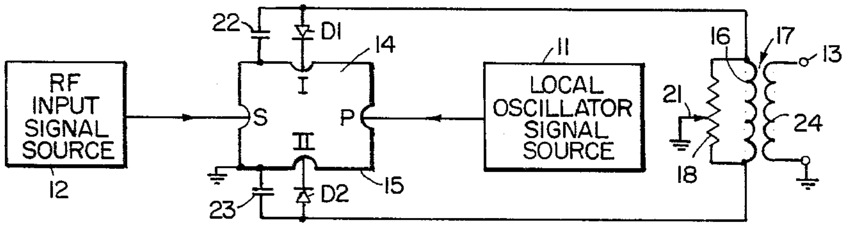
FIG. 1 is a combined block-schematic circuit diagram of a balanced detecting system embodying the principles of the invention in which the local oscillator signal is coupled to the parallel branch.

With reference now to the drawing and more particularly FIG. 1 thereof there is shown a combined block-schematic circuit diagram generally illustrating the logical arrangement of a system according to the invention in which the relatively high level local oscillator signal from source 11 is combined with the relatively low level signal from R.-F. input signal source 12 to provide a difference frequency signal on output terminal 13 virtually free from local oscillator signal and noise.

This system comprises a hybrid 14 having a series branch S, a parallel branch P and a pair of side branches, I and II. Hybrid 14 includes means for coupling a signal applied to the series branch to the side branches in phase opposition while also including means for coupling signals applied to the parallel branch to the side branches in substantial phase coincidence. In a representative embodiment of the invention, hybrid 14 may be a commercially available Alford type 1027 hybrid available from Alford Manufacturing Co. described in Patent No. 2,976,497. This type of hybrid includes a conductive casing diagrammatically represented by the outline 15, normally maintained at ground or reference potential, access to the various branches being through coaxial terminal pairs.. Thus, an unbalanced signal applied to the series branch is in effect converted into a signal between the two side branch inner terminals that is balanced with respect to ground potential. That is, when one side branch inner terminal is positive, the other is negative. When an unbalanced signal is applied to the parallel branch, the two side branch inner terminals receive this energy in substantial phase coincidence. That is, when one side branch inner terminal is positive, so is the other. Any of the standard hybrids listed in the Alford Manufacturing Co., 1962, catalog SK, including the "Hybridge" R.-F. network described in Patent No. 2,950,449 may be employed, or other electrical networks which perform the equivalent function.

Local oscillator signal source 11 energizes the parallel branch P while the signal containing the information to be detected from R.-F. input signal source 12 is delivered to the series branch S. Like-poled diodes D1 and D2, that is diodes having corresponding elements connected to respective ones of the side branch inner terminals, couple side branches I and II respectively to respective ends of the primary 16 of transformer 17. A balancing potentiometer 18 is connected across primary 16 with its arm 21 connected to ground. Bypass capacitors 22 and 23 bypass unwanted high frequencies to ground so that with the arm 21 of potentiometer 18 optimally adjusted, the only signal developed across the secondary winding 24 of transformer 17 is an output signal corresponding to the difference between the frequency of the signal spectral components received upon the series branch and the frequency of the local oscillator signal received on the parallel branch with local oscillator signal and noise almost completely rejected.

Before describing other embodiments of the invention, it is helpful to consider the principles of operation which result in maintaining a high degree of isolation between series and parallel branches while still performing the mixing function. It has been discovered that so long as the side branches are terminated in substantially equal impedances at nearly every instant of time, a high degree of isolation may be maintained between series and parallel branches, even though the side branch impedances vary considerably as a function of time. One practical way of taking advantage of this property is shown in FIG. 1. The local oscillator signal is made sufficiently strong so that it renders diodes D1 and D2 simultaneously alternately conductive and not conductive during corresponding time intervals. Thus, when diodes D1 and D2 are conducting, the side branches are terminated in low but very nearly equal impedances by choosing a pair of diodes with nearly the same characteristics. Conversely, when the two diodes are nonconductive, side branches I and II are terminated in much higher but still nearly equal impedances. Since the local oscillator signal reaches the side branches I and II in substantial time phase, diodes D1 and D2 are turned on and off at substantially the same instants of time.

Meanwhile the signal from R.-F. input signal source 12 received on the series branch S is typically too low in amplitude to appreciably influence the switching times of diodes D1 and D2. The net result is that when diodes D1 and D2 are conducting, they effectively connect the oppositely phased signals delivered to side branches I and II from the series branch to the opposite ends of winding 16 to produce a corresponding signal current through the primary winding 16. Since the local oscillator signal then at the two side branches is virtually the same when coupled to the opposed ends of winding 16, there is virtually no current flow through primary winding 16 due to local oscillator signal or noise.

It can be shown that the signal developed across primary winding 16 will include sum and difference frequency components of the signals applied to the series and parallel branches. In a typical balanced detecting system, only the difference frequency is of interest and the sum frequency components are bypassed by capacitors 22 and 23. Thus only the difference frequency spectral components developed across secondary winding 24 for delivery to output terminal 13.

If diodes D1 and D2 were perfectly matched, the arm 21 would be positioned at precisely the midpoint. As a practical matter it has been discovered that even so-called "matched" pairs have different characteristics in the VHF and UHF frequency range. Appropriately positioning arm 21 helps compensate for this unbalance. To optimize the setting, the local oscillator signal is applied to parallel branch P with source 11 adjusted to emit a signal sufficiently large to switch the diodes but small enough to avoid burning them out. A typical input power is ¼ watt to an input impedance of 50 ohms at parallel branch P while R.-F. input signal source 12 is coupled to the series branch S preferably then emitting no signal. A meter, or other suitable detecting device responsive to the local oscillator signal amplitude, is connected to terminal 13 and potentiometer arm 21 adjusted to produce a minimum indication on the meter or other detecting device. This technique thus provides optimum dynamic balance, even though the D.-C. current drawn by the two crystals may differ slightly.

Figure 2:
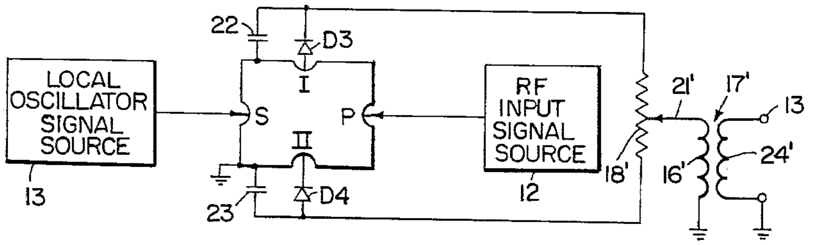
FIG. 2 illustrates the logical arrangement of a system embodying the principles of the invention in receiving the local oscillator signal on the series branch.

Referring now to FIG. 2, there is shown another embodiment of the invention in which oppositely poled diodes D3 and D4, that is diodes having different elements connected to respective ones of the side branch inner terminals, direct-couple side branches I and II, respectively, to respective ends of load potentiometer 18′. In this system the local oscillator signal from source 13 which controls the conductivity of diodes D3 and D4 is applied to the series branch S while the parallel branch P receives the relatively low level R.-F. input signal from source 12. Arm 21′, adjusted to minimize local oscillator signal amplitude across secondary winding 24′ in a manner similar to that described above, couples the point on potentiometer 18′ where local oscillator signal is substantially zero to primary winding 16′ of transformer 17′ to develop the desired difference frequency output signal across secondary winding 24′.

This apparatus also functions to maintain the impedance terminating side branches I and II substantially equal by rendering diodes D3 and D4 conductive and nonconductive at substantially the same time. However, to achieve this result, diodes D3 and D4 are oppositely poled because the local oscillator signal delivered to the side branches arrives at the side branches in relative phase opposition. Thus, when the inner terminal of side branch I is negative, that of side branch II is positive so that both diodes D3 and D4 conduct while the reverse situation results in both diodes being simultaneously nonconductive. The low level R.-F. input signal received on parallel branch P negligibly affects the instant of time when diodes D3 and D4 switch between conduction and nonconduction. With diodes D3 and D4 conducting, the potential due to local oscillator signal applied to the opposed ends of potentiometer 18′ is of substantially the same magnitude but opposite sense with respect to ground to produce opposed substantially equal currents flowing through potentiometer arm 21′ and thereby no net current at local oscillator frequency through primary winding 16′. Meanwhile the signal input transmitted to side branches I and II from the parallel branch P are of the same sense at the opposite ends of potentiometer 18′ to produce parallel currents which flow through arm 21′ and develop signal currents flowing through primary winding 16′ switched at a rate controlled by the local oscillator signal.

Figure 3:
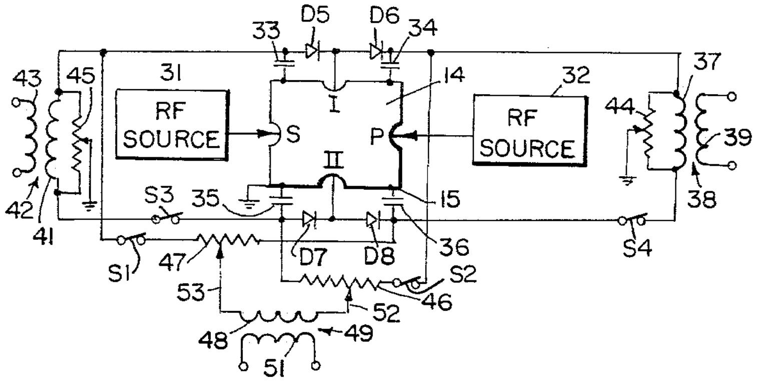
FIG. 3 shows a system in which the local oscillator signal may be applied to either branch or both branches and still maintain a high degree of isolation between series and parallel branches.

Referring to FIG. 3, there is shown still another embodiment of the invention incorporating the features of both FIGS. 1 and 2 to achieve isolation between R.-F. source 31 coupled to series branch S and R.-F. source 32 coupled to parallel branch P, regardless of which of the two branches receives the high level signal and regardless of whether both branches simultaneously receive high level signals. To this end, oppositely-poled parallel connected diodes D5 and D6 are connected to side branch I while diodes D7 and D8 are connected to side branch II. Diodes D5–D8 are by-passed to the grounded conductive casing 15 by capacitors 33–36, respectively. With the switches S1–S4 closed as shown, cathodes of diodes D6 and D8 are connected to opposite ends of primary winding 37 of transformer 38 having a secondary winding 39, and the anodes of diodes D5 and D7 are connected to opposite ends of the primary winding 41 of transformer 42 having a secondary winding 43. Primary windings 37 and 41 are shunted by potentiometers 44 and 45, respectively. The arm of each of potentiometers 44 and 45 is grounded to permit balance adjustment in the manner described above in connection with the embodiment of FIG. 1.

With the switches S1–S4 closed as shown, the cathode of diode D6 and the anode of diode D7 are connected to opposite ends of potentiometer 46, and the anode of diode D5 and the cathode of diode D8 are connected to opposite ends of potentiometer 47. The primary winding 48 of transformer 49 having secondary winding 51 intercouples the arm 52 of potentiometer 46 and the arm 53 of potentiometer 47, adjustable to maximize balance in the manner described above in connection with the circuit of FIG. 2.

By coupling secondary windings 39, 43 and 51 in series aiding, a desired signal of relatively high level may be obtained. Alternately, three separate outputs may be provided, or only windings 39 and 43 may be coupled in series aiding to provide one output while winding 51 provides another output. It makes no difference whether one or both of sources 31 and 32 are the high level sources because balance is still maintained. This occurs because at least one diode of the pair connected to each side branch is nearly always conducting to keep the impedance in the side branches substantially the same at all times.

By opening one or more of switches S1–S4, transformers 38 and 42 and potentiometers 46 and 47 may be selectively disconnected from carrying signal currents.

Regardless of whether either or both of the signals on series and parallel branches are sufficiently strong to switch the diodes, isolation between the two branches remains high because the side branches remain terminated in substantially equal impedances at all times. At all times one diode connected to each side branch will be conducting while the other is cut off.

In an actual embodiment of the invention of the type shown in FIG. 1 employing an Alford type 2210 hybrid with the oscillator delivering about a volt to the P input at 1600 megacycles and with Microwave Associates type 1N416EMR diodes D1 and D2 shunted by capacitors 22 and 23 of about 70 micromicrofarads and with a signal oscillator delivering a few millwatts to the S branch in its characteristic impedance of 50 ohms at 1630 mc., a high degree of isolation between series and parallel branches was obtained while developing a clean 30 mc. difference frequency signal at the output.

There has been described a novel signal combining system capable of providing an exceptionally high degree of isolation between a pair of branches adapted to receive the signals to be combined operative over a relatively wide range of frequencies while efficiently combining the signals. The specific embodiments of the invention have been described in connection with balanced detecting. Nevertheless, the principles of the invention have numerous other application such as in unbalanced detecting, single sideband modulation, and other forms of modulation and demodulation.

It is evident that those skilled in the art may now make numerous modifications of and departures from the specific embodiments described herein and uses of the invention without departing from the inventive concepts disclosed herein. Consequently, the invention is to be construed as limited solely by the spirit and scope of the appended claims.

What is claimed is:

1. Electrical signal combining apparatus comprising,
hybrid means having a parallel branch, a series branch and first and second side branches,
said hybrid means including both means for delivering a signal applied to said series branch to said side branches in substantial phase opposition and means for delivering a signal applied to said parallel branch to said side branches in substantial phase coincidence,
means including first and second nonlinear impedance means for terminating said first and second side branches respectively,
and means for adjusting the dynamic characteristics of said first and second nonlinear impedance means so that the latter are responsive to a signal applied to one of said series and parallel branches, for terminating said side branches in substantially equal time varying impedances to continuously maintain a high degree of isolation between said series and parallel branches.

2. Electrical signal combining apparatus in accordance with claim 1 and further comprising a source of a local oscillator signal,
said nonlinear impedance means comprising unilaterally conducting devices, first and second ones of said unilaterally conducting devices coupled to said first and second side branches respectively, and
means for coupling said local oscillator signal source to one of said series and parallel branches to simultaneously and substantially equally alter the conductivity of said unilaterally conducting devices.

3. Electrical signal combining apparatus in accordance with claim 2 wherein said first and second devices are poled in the same sense,
and said local oscillator is coupled to said parallel branch.

4. Electrical signal combining apparatus in accordance with claim 2 wherein said first and second devices are poled in the opposite sense,
and said local oscillator is coupled to said series branch.

5. Electrical signal combining apparatus in accordance with claim 2 and further comprising,
an output terminal,
means including said nonlinear impedance means for establishing both a direct current path and an A.-C. path for said local oscillator signal for coupling the signal at said side branches to said output terminal while preventing the transmission of said local oscillator signal to said output terminal.

6. Electrical signal combining apparatus in accordance with claim 2 and further comprising an output terminal,
a transformer having a primary winding and a secondary winding,
said first and second unilaterally conducting devices being poled in like sense and coupling said first and second side branches respectively to respective ends of said primary winding,
and means for coupling said secondary winding to said output terminal.

7. Electrical signal combining apparatus in accordance with claim 2 and further comprising an output terminal,
a load resistance,
said first and second unilaterally conducting devices being poled in opposite sense and direct coupling said first and second side branches to respective ends of said load resistance,
and means for coupling a point on said load resistance where the amplitude of said local oscillator signal is substantially zero to said output terminal.

8. Electrical signal combining apparatus comprising,
hybrid means having a parallel branch, a series branch and first and second side branches,
said hybrid means including both means for delivering a signal applied to said series branch to said side branches in substantial phase opposition and means for delivering a signal applied to said parallel branch to said side branches in substantial phase coincidence,
means including first and second nonlinear impedance means for terminating said first and second side branches respectively,
said first and second nonlinear impedance means being responsive to a signal applied to one of said series and parallel branches for terminating said side branches in substantially equal time varying impedances to continuously maintain a high degree of isolation between said series and parallel branches,
a source of a local oscillator signal,
said nonlinear impedance means comprising unilaterally conducting devices,
first and second ones of said unilaterally conducting devices coupled to said first and second side branches respectively,
means for coupling said local oscillator signal source to one of said series and parallel branches to simultaneously and substantially equally alter the conductivity of said unilaterally conducting devices, said nonlinear impedance means further comprising third and fourth ones of said unilaterally conducting devices,
and means for coupling said third and fourth unilaterally conducting devices to said first and second side branches respectively,
said third and fourth devices being poled opposite to said first and second devices respectively.

9. Electrical signal combining apparatus comprising,
hybrid means having a parallel branch, a series branch and first and second side branches,
said hybrid means including both means for delivering a signal applied to said series branch to said side branches in substantial phase opposition and means for delivering a signal applied to said parallel branch to said side branches in substantial phase coincidence,
means including first and second nonlinear impedance means for terminating said first and second side branches respectively,
said first and second nonlinear impedance means being responsive to a signal applied to one of said series and parallel branches for terminating said side branches in substantially equal time varying impedances to continuously maintain a high degree of isolation between said series and parallel branches,
a source of a local oscillator signal,
said nonlinear impedance means comprising unilaterally conducting devices,
first and second ones of said unilaterally conducting devices coupled to said first and second side branches respectively,
means for coupling said local oscillator signal source to one of said series and parallel branches to simultaneously and substantially equally alter the conductivity of said unilaterally conducting devices, an output terminal,
a transformer having at least one primary winding and a secondary winding,
said first and second unilaterally conducting devices being poled in like sense and arranged for selectively coupling said first and second side branches respectively to respective ends of a said primary winding,
means for coupling said secondary winding to said output terminal,
a load resistance,
said nonlinear impedance means further comprising third and fourth unilaterally conducting devices,
said third and fourth unilaterally conducting devices being poled in opposite sense,
means including a pair of said unilaterally conducting devices for coupling said first and second side branches respectively to respective ends of said load resistance,
said third and fourth devices being poled opposite to said first and second devices respectively,
and means for coupling a point on said load resistance where the amplitude of said local oscillator signal is substantially zero to said output terminal.

10. Electrical signal combining apparatus in accordance with claim 9 wherein the last-mentioned means for coupling comprises a transformer.

References Cited by the Examiner

UNITED STATES PATENTS

| | | | |
|---|---|---|---|
| 2,116,814 | 5/1938 | Wilbur | 325—475 |
| 2,550,524 | 4/1951 | Braden | 325—445 X |

ROBERT H. ROSE, *Primary Examiner.*

DAVID G. REDINBAUGH, *Examiner.*